United States Patent [19]

Tujimura et al.

[11] Patent Number: 4,815,280
[45] Date of Patent: Mar. 28, 1989

[54] THERMAL FLOW METER

[75] Inventors: Kiyoharu Tujimura; Osamu Akebe; Kiyoshi Satoh, all of Kyoto, Japan

[73] Assignee: STEC Inc., Kyoto, Japan

[21] Appl. No.: 49,147

[22] Filed: May 13, 1987

[30] Foreign Application Priority Data

May 27, 1986 [JP] Japan .................. 61-121877

[51] Int. Cl.$^4$ ............................................. G01F 1/68
[52] U.S. Cl. .................... 73/204.12; 73/204.22
[58] Field of Search ........................................ 73/204

[56] References Cited

U.S. PATENT DOCUMENTS

| 2,594,618 | 4/1952 | Booth, Jr. | 73/204 |
| 2,729,976 | 1/1956 | Laub | 73/204 |
| 3,827,299 | 8/1974 | Welland | 73/204 |
| 4,517,838 | 5/1985 | Wachi et al. | 73/204 |
| 4,548,075 | 10/1985 | Mariano | 73/204 X |

FOREIGN PATENT DOCUMENTS 62-62220 3/1987 Japan .
62-62221 3/1987 Japan .

Primary Examiner—Herbert Goldstein
Attorney, Agent, or Firm—Wenderoth, Lind & Ponack

[57] ABSTRACT

A sensor case housing a pair of sensor coils wound around a peripheral surface of a conduit, through which a fluid flows, therein is formed of two block members made of materials superior in heat conductivity, at least one of said block members being provided with a pair of support projections formed integrally with said block member adjacent to both ends of said sensor coils on an inner surface thereof, and said conduit being held by means of said support projections.

4 Claims, 5 Drawing Sheets

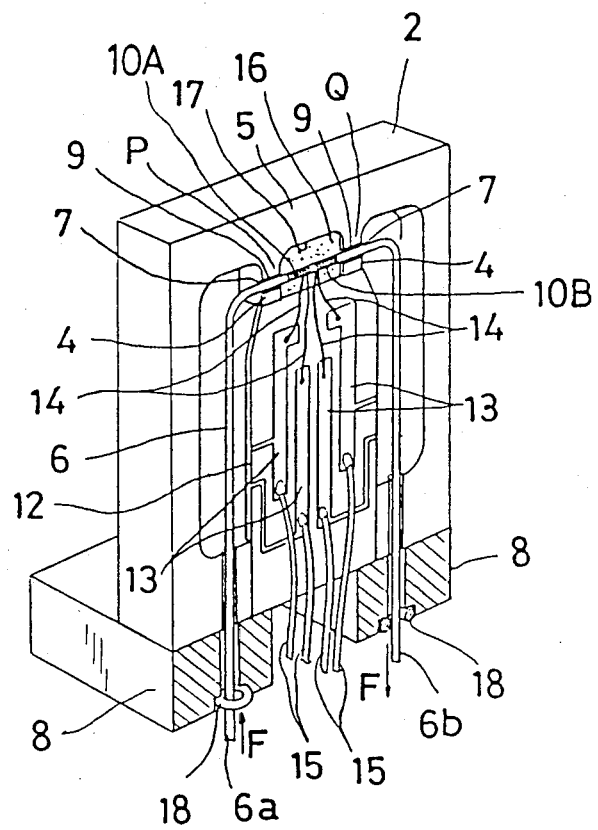
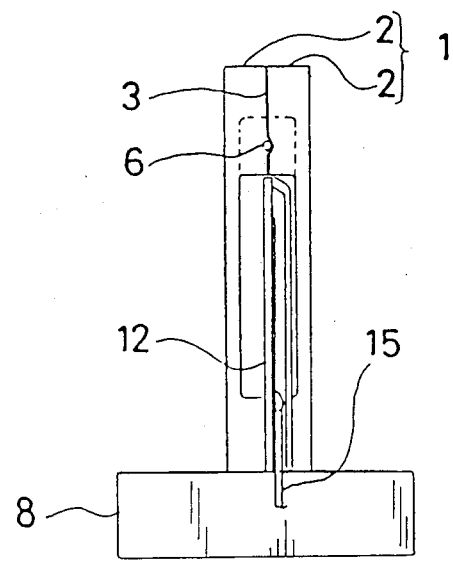
Fig.1
Fig.2

THERMAL FLOW METER

BACKGROUND OF THE INVENTION

1. Field of the Invention

The present invention relates to a thermal flow meter.

2. Description of the Prior Art

One flow meter of such type has been disclosed in Japanese Patent Examined Publication No. Sho 60-50289. Referring now to FIG. 7 roughly showing the above described flow meter, said flow meter comprises a conduit 50, through which a sample fluid passes, provided with sensor coils 51, 52 formed of a heat sensitive resistance wire wound around the peripheral surface thereof, a bridge circuit WS with said sensor coils 51, 52 and resistances 53, 54 as sides being formed, a first closed space 55 comprising said sensor coils 51, 52 being formed outside of said sensor coils 51, 52, said conduit 50 being provided with an enveloping member 56 formed of heat conductive materials mounted thereon by the thermal jointing, said enveloping member 56 being surrounded with a second closed space 57, said conduit 50 being provided with an outside enveloping member 58, whereby forming a convection-preventing means for said first closed space 55 and said second closed space 57, and a flow rate of the fluid flowing through the conduit 50 being determined on the basis of a shift of the bridge circuit WS from the balanced state. In addition, reference numeral 59 designates an output terminal.

In the flow meter constructed in the above described manner the vicinity of the sensor coils 51, 52 is thermally stabilized by means of the enveloping member 56 provided in the vicinity of the sensor coils 51, 52 and the closed spaces 55, 57 provided with the convection-preventing means, whereby no change of an outside temperature reaching the sensor coils 51, 52 and furthermore, the heat convection within the flow meter can be prevented even though the flow meter is inclined to some extent in the installation and the like thereof, so that the sensor coils 51, 52 can operate under the stabilized temperature condition to achieve the accurate determination of a flow rate.

However, the above described prior art has the following disadvantages:

In general, a flow meter of this type has been frequently installed in a feed passage of gases used in the manufacture of semiconductors but since high boiling substances contained in said gases are adhered to an inner wall of the conduit after the use for a long time according to circumstances, it is necessary to remove said high boiling point substances by baking out with flowing inert gases, such as nitrogen, through the conduit or depressurizing whenever occasion arises. This baking out operation is carried out by heating the conduit up to an appointed temperature. For example, a ribbon heater is wound around the peripheral surface of a case including said conduit therein or a heater (for example "POSISTER" (trade name) manufactured by Murata Works, Co., Ltd.), which is formed of a self temperature control type resistor having a positive resistance temperature coefficient whose resistance value is suddenly increased at a certain design temperature or more, is closely mounted on the peripheral surface of said case including said conduit therein.

In such the prior art as shown in FIG. 7, the conduit 50 is adapted to be covered by the enveloping member 56 and the outside enveloping member 58 other than said enveloping member 56, whereby the enveloping member 56 is thermally connected with the conduit 50, so that it takes a considerably long time for a temperature of the conduit 50 to reach a temperature required for the baking out operation and as a result, it is difficult to efficiently carry out the baking out operation in a short time even though the outside enveloping member 58 is heated by for example the ribbon heater wound around the peripheral surface thereof. In addition, the conduit 50 and the sensor coils 51, 52 surrounding said conduit 50 are adapted to be doubly enveloped by the enveloping member 56 and the outside enveloping member 58, so that the problems occur also in that the construction of taking out a lead wire and the like are complicated in addition to the inferior workability and the expensiveness.

SUMMARY OF THE INVENTION

The present invention was achieved in view of the above described matters. It is an object of the present invention to provide a thermal flow meter which is simple in construction and capable of surely carrying out the baking out operation in a short time and easily carrying out the assembling and the like.

In order to achieve the above described object, a thermal flow meter comprising a conduit, through which a fluid flows, whose peripheral surface is surrounded by a pair of sensor coils according to the present invention is characterized by that a sensor case is formed of two block members made of heat conductive materials and at least one of said block members is provided with a pair of support projections formed integrally with said block member in the vicinity of both ends of the sensor coils on an inner surface thereof to hold said conduit by means of said support projections.

BRIEF DESCRIPTION OF THE DRAWINGS

One preferred embodiment of the present invention is shown in FIGS. 1 to 4, in which FIG. 1 is a perspective view showing a state where one block member was removed;

FIG. 2 is a side sectional view;

DESCRIPTION OF THE PREFERRED EMBODIMENTS

Figure 3:
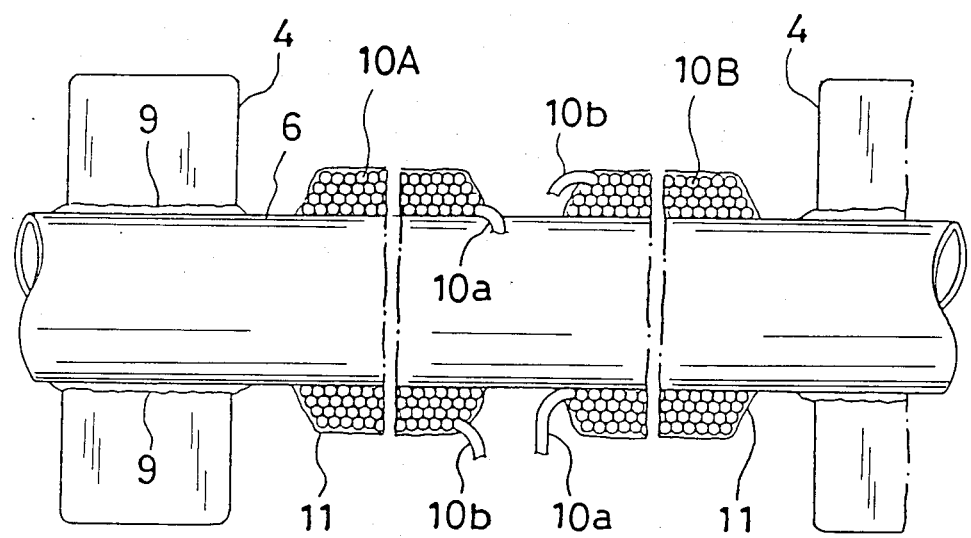
FIG. 3 is a sectional view showing a state of sensor coils wound around a conduit.

The preferred embodiments of the present invention will be below described with reference to the drawings.

Referring now to FIGS. 1, 2, reference numeral 1 designates a sensor case comprising two split block members 2, 2 having a symmetrical shape. Reference numeral 3 designates heat conductive adhesives made of epoxy resins and the like containing silver and the like to be applied on the splicing surface of said block members 2, 2.

The block members 2, 2 are provided with a pair of support projections 4, 4 formed integrally therewith at suitable intervals on an inner surface thereof. Reference numeral 5 designates a bridge portion formed across the support projections 4, 4 so as to thermally communicate the support projections 4, 4 with each other. In short, the block members 2, 2 are provided with the support members 4, 4 and the bridge portion 5 formed integrally therewith on an inner surface thereof. And, the support projections 4, 4 are provided with dented portions 7, 7 for holding a conduit 6, which will be mentioned later, formed on an upper surface thereof.

Said sensor case 1 is formed of heat conductive materials, for example, epoxy resins comprising silver powders or metals such as aluminium and stainless steel.

The conduit 6 is formed of an almost reverse U letter-shaped metallic pipe made of stainless steel and the like and put in said dented portions 7, 7 under the condition that it is inserted through bases 8, 8 made of stainless steel and the like at both ends 6a, 6b thereof so that a sample fluid F may flow through the conduit 6 in the direction of an arrow. Reference numerals 9, 9 designate heat conductive adhesives made of epoxy resins and the like comprising silver and the like used for reinforcing the thermal connection between the conduit 6 and the support projection 4.

10A, 10B designate a pair of self heating type sensor coils wound around the peripheral surface of the conduit 6 between the support projections 4, 4 of the conduit 6. As shown in FIG. 3, the sensor coils 10A, 10B are formed in a four-layer construction by folding the end portions thereof three times so that the winding-starting positions and the winding-finishing positions (for example, 10a, 10a designate the winding-starting sides while 10b, 10b designate the winding-finishing sides) thereof may be positioned in the midst of both sensor coils 10A, 10B. And, the sensor coils 10A, 10B are thermally connected with the conduit 6 (electrically insulated). The end portions of the sides of the sensor coils 10A, 10B are positioned so as to be adjacent to said support projections 4, 4 as far as such positioning is possible. These sensor coils 10A, 10B ar formed of a heat sensitive resistance wire having a large temperature coefficient made of Fe-Ni alloys and the like.

In addition, referring to FIG. 3, reference numeral 11 designates a layer formed of silicone varnishes, polyimide varnishes and the like for fixing and preventing the sensor coils 10A, 10B wound in the above described manner from getting loose, and so as to coat the sensor coils 10A, 10B.

Reference numeral 12 designates a lead stand made of heat-resisting materials such as ceramics, polyimide resins and polyamide resins provided with a plurality of electrically conductive portions 13 —formed on one side thereof by metallizing. Reference numerals 14—designate lead wires connected to the winding-starting sides 10a—and the winding-finishing sides 10b—at both ends of the sensor coils 10A, 10B, reference numerals 15—designating outside lead wires.

Reference numeral 16 designates a thermal insulating material, such as quartz glass wool, put in an inner space 17 opened in one side (the lower side in FIG. 1) only and closed in other three sides so as to be filled in the circumference of the conduit 6 between the support projections 4, 4 and a pair of sensor coils 10A, 10B wound around the conduit 6. Reference numerals 18, 18 designate metallic sealing members to be put in a groove formed in a lower end surface of the bases 8, 8.

Figure 4:
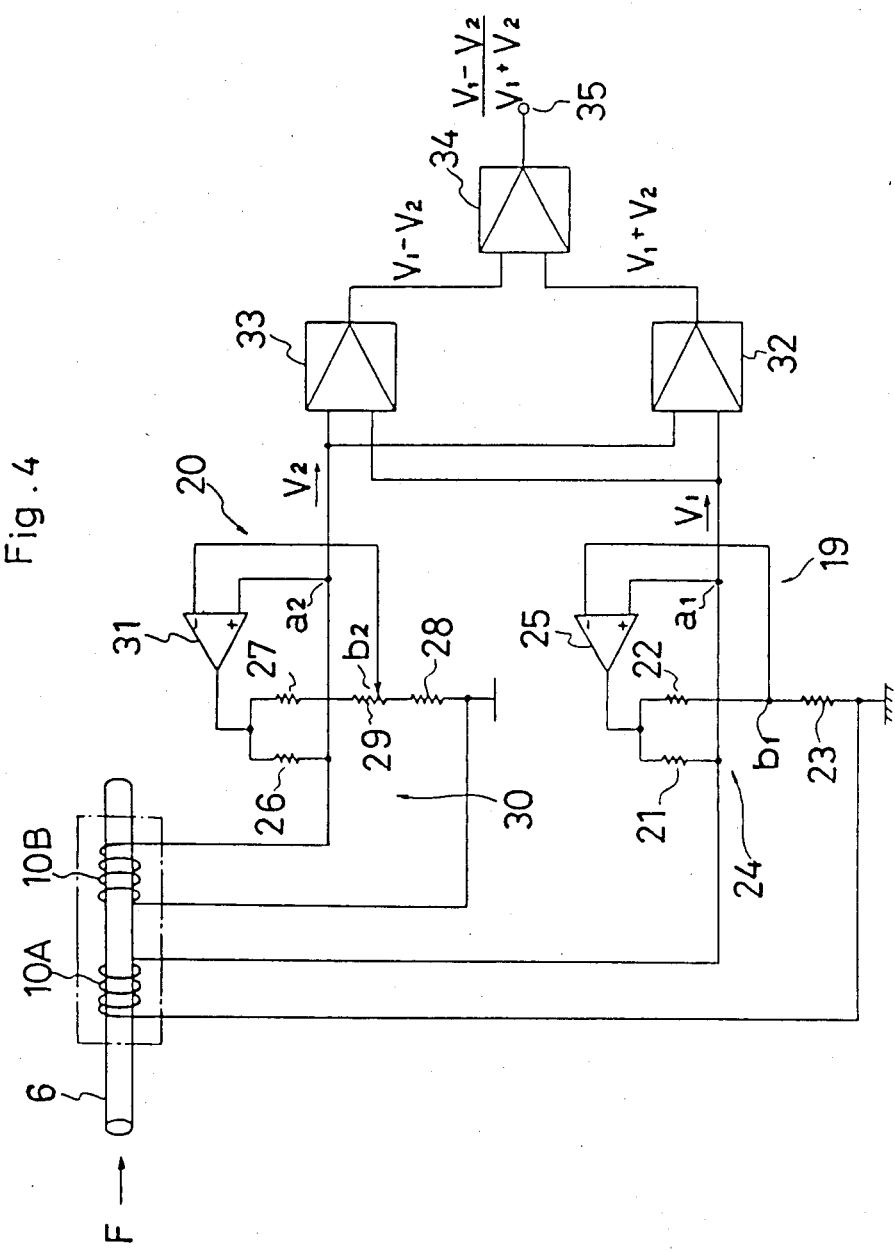
FIG. 4 is a block circuit diagram.

The circuit construction and the operation of the thermal flow meter according to the present invention will be below described with reference to FIG. 4.

Reference numerals 19, 20 designate constant temperature control circuits comprising said sensor coils 10A, 10B as constituent elements of bridge circuits 24, 30, which will be mentioned later, respectively. Both the circuit 19 and the circuit 20 are constructed from the same parts and control so that a temperature of said sensor coil 10A may be always equal to that of said sensor coil 10B and they may be always constant.

That is to say, the constant temperature control circuit 19 is provided with the bridge circuit 24 comprising the sensor coil 10A, a temperature-setting resistance 21 for the sensor coil 10A and bridge resistances 22, 23 and a control circuit 25.

On the other hand, the constant temperature control circuit 20 is provided with a bridge circuit 30 comprising the sensor coil 10B, a temperature-setting resistance 26 for the sensor coil 10B, bridge resistances 27, 28 and a variable resistance 29 and a control circuit 31.

In the case where a flow rate of a fluid flowing through the conduit 6 is zero, said variable resistance 29 is controlled so that an output from said bridge circuit 24 may be equal to that from said bridge circuit 30.

In addition, temperature coefficients of said resistances 21, 22, 23, 26, 27, 28 29 are set so as to be sufficiently small in comparison with those of said sensor coils 10A, 10B.

$a_1$, $a_2$ each designates an output point of the bridge circuit 24, 30, respectively. In addition, $b_1$, $b_2$ each designates a joint of the resistance 22 with the resistance 23 and that of the resistance 27 with the resistance 28 (strictly speaking, the variable resistance 29), respectively.

Said control circuit 25 compares an electric potential at the output point $a_1$ with that at the joint $b_1$ to put out an output to the bridge circuit 24 when there is a difference between both electric potentials, whereby maintaining an equilibrium of said circuit 24. Also said control circuit 31 acts so as to maintain an equilibrium of the bridge circuit 30 on the basis of electric potentials at the output point $a_2$ and the joint $b_2$ in the same manner as in said control circuit 25.

Reference numeral 32 and 33 designates an adding circuit and a subtracting circuit, respectively, which receives electric potentials $V_1$, $V_2$ put out from the output points $a_1$, $a_2$ as inputs. The former puts out $V_1 + V_2$ as an adding output while the latter puts out $V_1 - V_2$ as a subtracting output.

Reference numeral 34 designates a dividing circuit for receiving the adding output from said adding circuit 32 and the subtracting output from said subtracting circuit 33 as inputs to put out $(V_1 - V_2)/(V_1 + V_2)$ as a dividing output. In addition, reference numeral 35 designates an output terminal.

And, when a flow rate of the fluid flowing through the conduit 6 is zero, the temperature of the sensor coil 10A, 10B is set at the value determined by the temperature-setting resistance 21, 26 of the bridge circuit 24, 30, respectively. And, since the characteristics of said temperature-setting resistance 21 are set so as to be equal to those of said temperature-setting resistance 26, the temperature of said sensor coil 10A becomes equal to that of said sensor coil 10B. A a result, the output $V_1$ from the output point $a_1$ becomes equal to the output $V_2$ from the output point $a_2$. Accordingly, an output from the output terminal 35 becomes zero, which shows that the fluid F is not flowing.

When the fluid F is flowing through the conduit 6, heat, which is removed from the sensor coil 10A by the fluid F, is given to the sensor coil 10B from the fluid F. Accordingly, the energy required for maintaining the temperature of the sensor coil 10A at the appointed value is increased, whereby increasing the output $V_1$ from the output point $a_1$. On the other hand, the energy required for maintaining the temperature of the sensor coil 10B at said appointed value can be saved by the quantity corresponding to the heat given from the fluid F. As a result, the output $V_2$ from the output point $a_2$ is reduced.

These outputs $V_1$, $V_2$ are put in the adding circuit 32 and the subtracting circuit 33. The adding circuit 32 and the subtracting circuit 33 puts out the adding output $V_1 + V_2$ and the subtracting output $V_1 - V_2$, respectively. These outputs are put in the dividing circuit 34 where the appointed division is carried out to put out the dividing output $(V_1 - V_2)/(V_1 + V_2)$.

Since said dividing output $(V_1 - V_2)/(V_1 + V_2)$ is proportional to a mass flow rate of the fluid F flowing through the conduit 6, the mass flow rate of the fluid F flowing through said conduit 6 is determined by multiplying said dividing output $(V_1 - V_2)/(V_1 + V_2)$ by a constant.

Since in the flow meter having the above described construction the support projections 4, 4 for holding the conduit 6 surrounded by the sensor coils 10A, 10B in a thermally connected manner are formed integrally with the block members 2, 2 and thermally connected with each other also by means of the bridge portion 5, there is little difference of temperature between an upstream side point P and a downstream side point Q of the sensor coils 10A, 10B and as a result, the time required for achieving thermal equilibrium is shortened, whereby improving the responsiveness. In addition, since the inner space 17 in the circumference of the sensor coils 10A, 10B is filled with the thermal insulating material 16, th temperature in the circumference of the sensor coils 10A, 10B can be stabilized and the heat convection within the flow meter can be prevented even though the flow meter is inclined much or less in the installation thereof. Accordingly, the sensor coils 10A, 10B can always operate under the stabilized temperature condition and correspond merely to the change of the flow rate of the fluid flowing through the conduit 6, whereby the flow rate of the fluid can be correctly measured.

In particular, since the conduit 6 is held by means of the support projections 4, 4 formed integrally with the block members 2, 2 formed of heat conductive materials, the block members 2, 2, that is to say the sensor case 1, are heated to heat said conduit 6 up to the appointed temperature during the baking out operation, whereby the desired baking out operation can be efficiently carried out in a short time. In addition, since the sensor coils 10A, 10B are wound around the peripheral surface of the conduit 6 between the support projections 4, 4, the lead wires of the sensor coils 10A, 10B can be easily taken out. Furthermore, the block members 2, 2 constructing the sensor case 1 are remarkably simple in construction, so that the manufacturing cost can be remarkably reduced.

And, in the event that the sensor coils 10A, 10B are wound around the peripheral surface of the conduit 6 in a four-layer construction, as described in the above described preferred embodiment, the lengths of the sensor coils 10A, 10B in the direction of the conduit 6 can be reduced and the temperature distribution is steepened all over the sensor coils 10A, 10B, whereby the response speed can be increased so much as that.

Furthermore, the winding construction of the sensor coils 10A, 10B is not limited to the four-layer construction. 2n-layer (n is natural numbers) constructions may be used. Besides, since the lead stand 12 is provided with a plurality of electrically conductive portions 13 and the electrical connection is carried out through these electrically conductive portions 13, the positions of connecting the sensor coils 10A, 10B with the electrically conductive portions 13 can be suitably changed.

Figure 5:
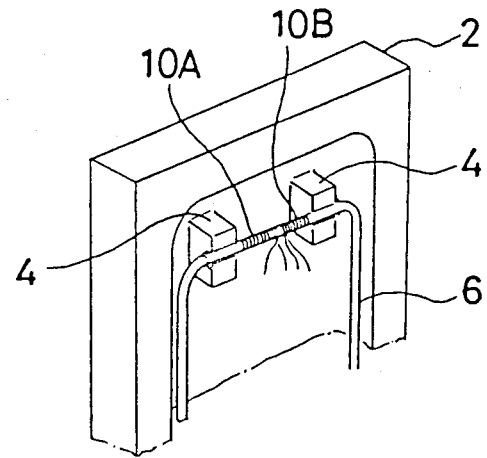
FIG. 5 is a perspective view showing the block member according to another preferred embodiment of the present invention.
Figure 7:
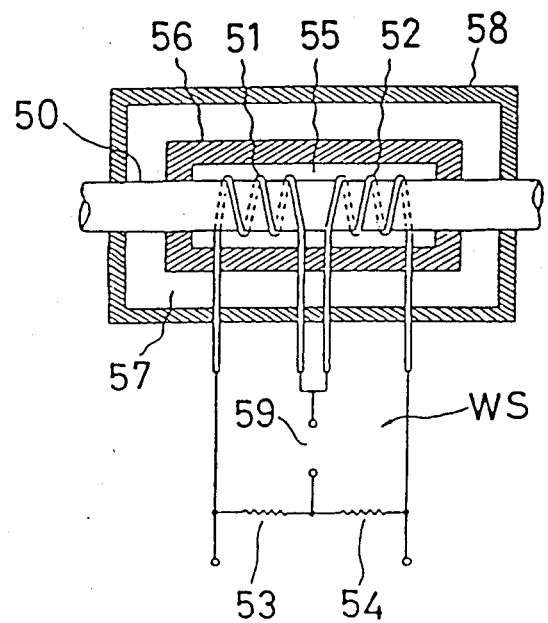
FIG. 7 is a sectional view for describing the prior art.

Referring to FIG. 5 showing another preferred embodiment of the present invention, a pair of support projections 4, 4 are formed integrally with the block members 2, 2 at a suitable interval. The preferred embodiment as shown in FIG. 5 is different from the above described preferred embodiment in absence of the bridge portion 5. Also in this preferred embodiment the similar effect as in the above described preferred embodiment can be achieved.

In addition, it is not always necessary to form the sensor case 1 of two symmetric block members 2, 2. Only one block member 2 may be provided with the support projection 4 and the bridge portion 5 (this bridge portion 5 is not required according to circumstances) to hold the conduit 6 by means of said support projection 4.

Furthermore, in the preferred embodiment as shown in FIG. 1 to 4 the self heating type sensor coils 10A, 10B are used but a separated heating type sensor coil may be used.

Figure 6:
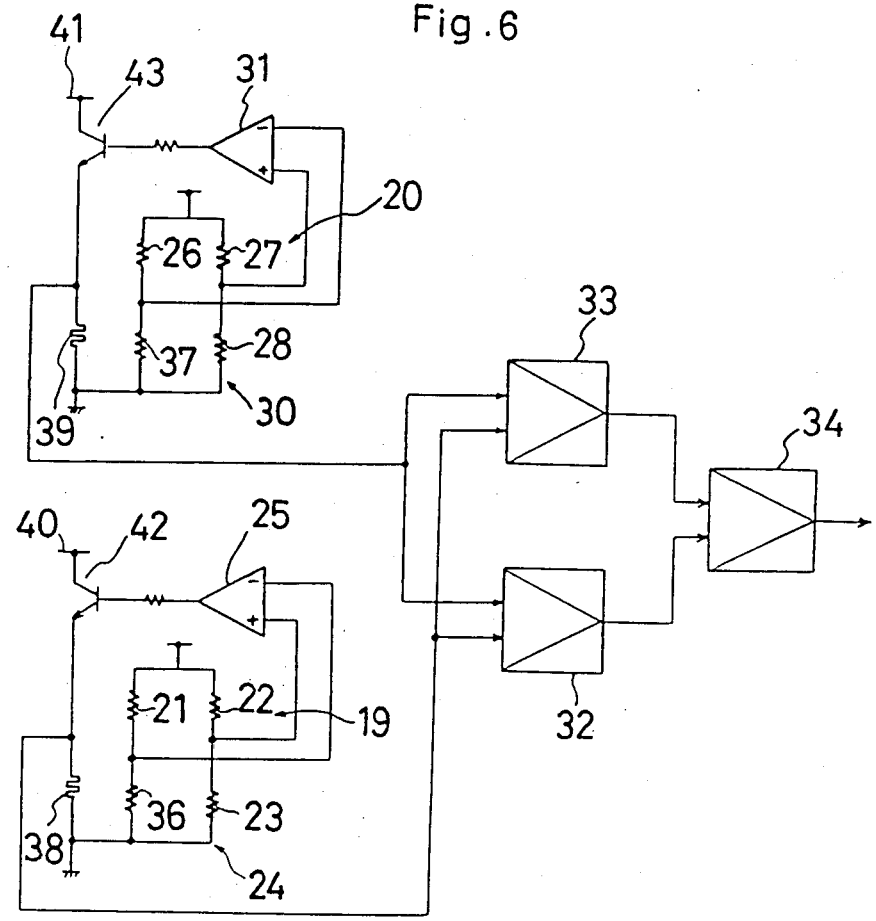
FIG. 6 is a block circuit diagram according to further another preferred embodiment of the present invention.

That is to say, referring to FIG. 6, reference numerals 36, 37 designate outside heating type heat sensitive coils, reference numerals 38, 39 designating heaters for heating the heat sensitive coils 36, 37, reference numerals 40, 41 designating power sources for the heaters 38, 39, and reference numerals 42, 43 designate control means for controlling the value of electric current on the basis of the signals from the control circuits 25, 31.

As above described, since in the thermal flow meter according to the present invention the sensor case is formed of two block members made of heat conductive materials, at least one of said block members being provided with a pair of support projections formed integrally with said block member adjacent to both ends of the sensor coil on the inner surface thereof to hold said conduit by means of said support projections, not only the sensor coil can operate under the always stabilized temperature environment but also the baking out operation can be surely carried out in a short time. In addition, since the sensor case is simple in construction, the lead wires can be easily taken out and also the manufacturing cost can be reduced.

Besides, in the thermal flow meter according to the present invention a gas phase can be prevented from being mixed with a liquid phase in the conduit during the measurement of flow rate, so that also an effect of surely capable of heating can be achieved even in the case where the sensor case is heated from the outside.

What is claimed is:
1. A thermal flow meter comprising:
   a fluid conduit means for passing a fluid therethrough;
   a pair of sensor coils, each sensor coil of said pair of sensor coils having a multi-layer structure of at least two layers of windings wound around and contacting a segment of the peripheral surface of said fluid conduit means, said pair of sensor coils being spaced apart along said peripheral surface of said fluid conduit means;

a sensor casing including two heat-conductive block members, said two block members surrounding said multi-layer structure of at least two layers of windings of each said sensor coil, at least one of said two block members having a pair of integral support projections supporting said fluid conduit means adjacent said pair of sensor coils, each one support projection of said pair of integral support projections being adjacent one each of said pair of sensor coils; and heat-conductive adhesives being between each one of said pair of integral support projections and said fluid conduit means for enhancing and stabilizing heat transfer between said integral support projections and said fluid conduit means.

2. A device as in claim 1, further comprising a bridge means integrally connecting said pair of support projections for thermally communicating said pair of support projections.

3. A device as in claim 1, further comprising a lead stand having a plurality of electrically conductive portions therein for connecting said pair of sensor coils to outside lead wires.

4. A device as in claim 1, wherein said multi-layer structure of at least two layers of windings of each said sensor coil includes at least four layers of windings.

* * * * *